United States Patent
Nakata et al.

(10) Patent No.: US 10,051,528 B2
(45) Date of Patent: Aug. 14, 2018

(54) COMMUNICATION APPARATUS, WIRELESS COMMUNICATION SYSTEM AND COMMUNICATION METHOD

(71) Applicant: NEC Corporation, Tokyo (JP)

(72) Inventors: Atsushi Nakata, Tokyo (JP); Yoshinori Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/507,937

(22) PCT Filed: Sep. 9, 2015

(86) PCT No.: PCT/JP2015/075556
§ 371 (c)(1),
(2) Date: Mar. 1, 2017

(87) PCT Pub. No.: WO2016/047439
PCT Pub. Date: Mar. 31, 2016

(65) Prior Publication Data
US 2017/0289865 A1    Oct. 5, 2017

(30) Foreign Application Priority Data

Sep. 25, 2014 (JP) .................................. 2014-194688

(51) Int. Cl.
*H04W 36/00* (2009.01)
*H04W 16/32* (2009.01)
(Continued)

(52) U.S. Cl.
CPC ....... *H04W 36/0033* (2013.01); *H04W 16/32* (2013.01); *H04W 36/0011* (2013.01); *H04W 36/08* (2013.01); *H04W 36/04* (2013.01)

(58) Field of Classification Search
CPC .......... H04W 36/0055; H04W 76/028; H04W 36/0061; H04W 36/00; H04W 36/0033; H04W 36/08; H04W 16/32
See application file for complete search history.

(56) References Cited

U.S. PATENT DOCUMENTS 7,092,711 B2 *  8/2006  Masuda ............ H04W 36/0061
                                                    370/331
2010/0197298 A1 *  8/2010  So ........................ H04W 24/10
                                                    455/424
(Continued)

FOREIGN PATENT DOCUMENTS

EP    2271142 A1   1/2011
EP    2405682 A2   1/2012
(Continued)

OTHER PUBLICATIONS

International Search Report corresponding to PCT/JP2015/075556 dated Oct. 13, 2015 (one page).
(Continued)

*Primary Examiner* — Nizar Sivji
(74) *Attorney, Agent, or Firm* — Wilmer Cutler Pickering Hale and Dorr LLP

(57) ABSTRACT

A communication apparatus according to the present invention is applied to a communication apparatus in a wireless communication system including a terminal, a first base station forming a first cell, and a second base station forming a second cell adjacent to the first cell. The communication apparatus includes: a communication status acquisition unit that acquires a communication status in the second base station; and a control unit that eliminates cell identifier duplication between a cell identifier of the second cell and a cell identifier of another cell based on the number of times that the second base station has received, from the terminal,
(Continued)

a first message requesting for re-establishment of an RRC connection.

8 Claims, 8 Drawing Sheets

(51) Int. Cl.
*H04W 36/08* (2009.01)
*H04W 36/04* (2009.01)

(56) References Cited

U.S. PATENT DOCUMENTS

| | | | | |
|---|---|---|---|---|
| 2010/0278037 | A1* | 11/2010 | Jen | H04W 76/028 370/216 |
| 2011/0117908 | A1 | 5/2011 | Huang et al. | |
| 2011/0206011 | A1 | 8/2011 | Ishida et al. | |
| 2011/0305184 | A1* | 12/2011 | Hsu | H04L 65/4076 370/312 |
| 2016/0007321 | A1* | 1/2016 | Zhang | H04W 48/12 370/312 |
| 2016/0142931 | A1* | 5/2016 | Mondal | H04L 67/141 370/252 |
| 2016/0262059 | A1* | 9/2016 | Butala | H04W 36/0033 |

FOREIGN PATENT DOCUMENTS

| | | | |
|---|---|---|---|
| JP | 2010109664 A | * | 10/2008 |
| JP | 2010-109664 A | | 5/2010 |
| WO | WO-2013/141656 A1 | | 9/2013 |
| WO | WO-2013/190993 A1 | | 12/2013 |
| WO | WO-2014/056142 A1 | | 4/2014 |

OTHER PUBLICATIONS

Intel Corporation, Discussion on small cell discovery operation, 3GPP TSG-RAN WG1 #72bis R1-130919, Apr. 15, 2013 (pp. 1-4).

Huawei, Updates to AAS evaluation, 3GPP TSG RAN WG3 Meeting #83bis R3-140538, Mar. 31, 2014 (3 pages).

3GPP TS 36.331 V9.18.0 (Jun. 2014) Technical Specification, 3rd Generation Partnership Project; Technical Specification Group Radio Access Network; Evolved Universal Terrestrial Radio Access (E-UTRA); Radio Resource Control (RRC); Protocol specification (Release 9), pp. 1-265 (Jun. 2014).

Extended European Search Report issued by the European Patent Office for European Application No. 15844978.5 dated Feb. 27, 2018 (11 pages).

HTC, "Clarification on Scell Configuration Failure," 3GPP TSG-RAN2, Meeting #72, R2-106558, Change Request, Jacksonville, Florida, United States, Nov. 15-19, 2010 (3 pages).

Japanese Office Action issued by the Japan Patent Office for Japanese Application No. 2016-550094 dated Feb. 20, 2018 (5 pages).

Rapporteur (Samsung), "Miscellaneous corrections and clarifications resulting from ASN.1 review [64_LTE_17]," 3GPP TSG-RAN2 Meeting #65, R2-091067 (Same as R2-090851), Athens, Greece, Feb. 9-13, 2009, Change Request (198 pages).

* cited by examiner

EXAMPLE OF CELL ARRANGEMENT IN LTE

OVERALL CONFIGURATION OF WIRELESS
COMMUNICATION SYSTEM ACCORDING TO
PRESENT INVENTION

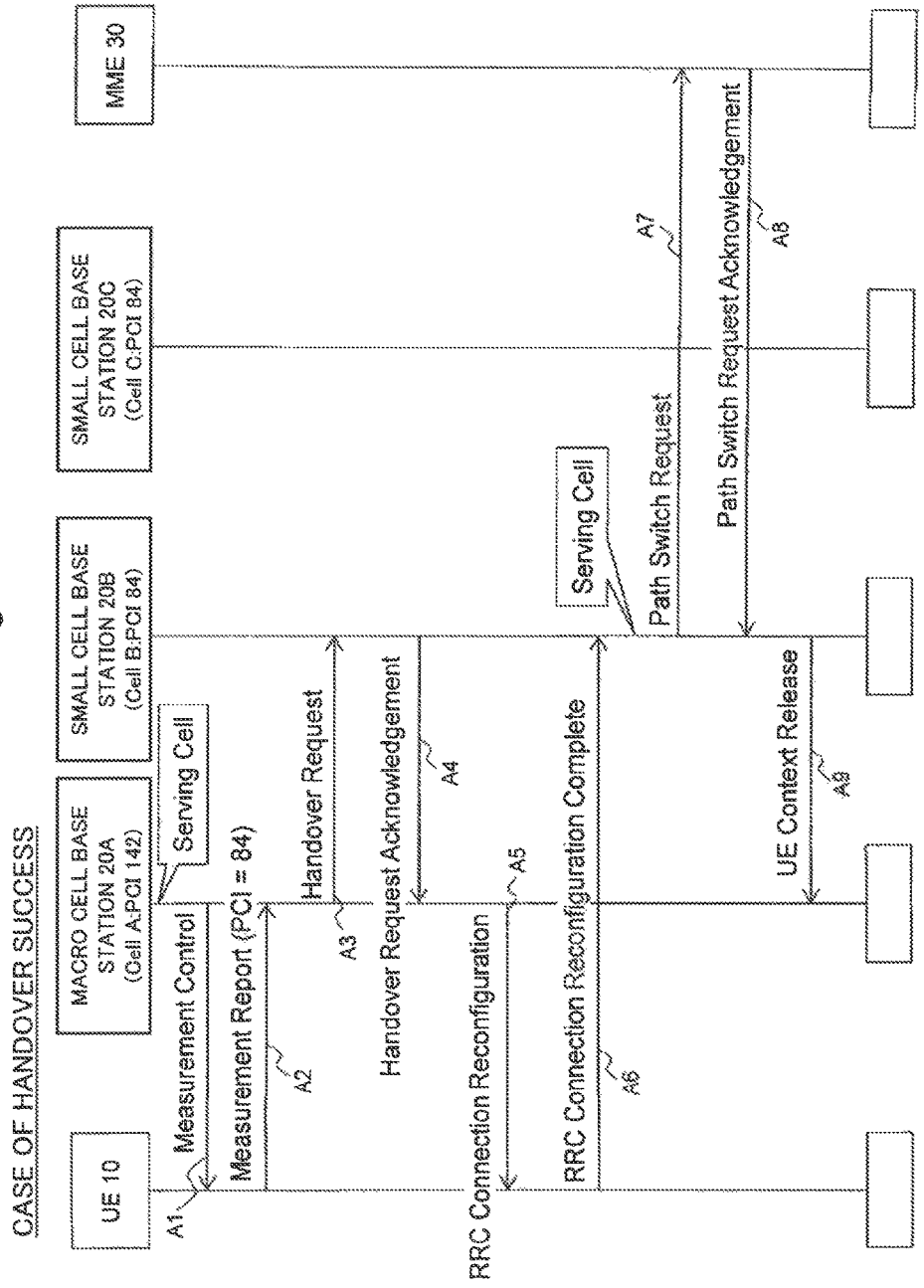

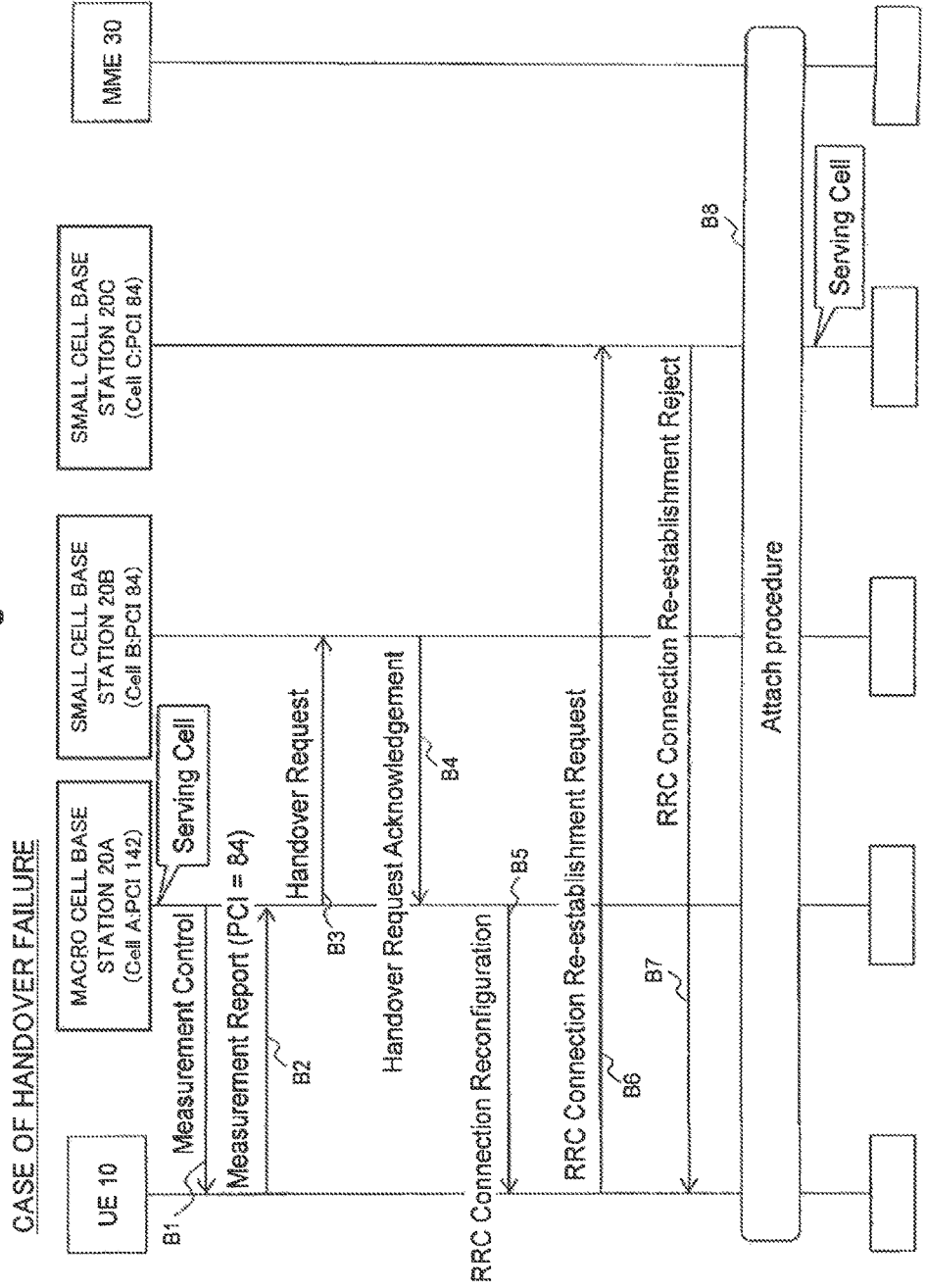

Fig. 5

*RRCConnectionReestablishmentRequest message*

```
-- ASN1START

RRCConnectionReestablishmentRequest ::=    SEQUENCE {
    criticalExtensions                      CHOICE {
        rrcConnectionReestablishmentRequest-r8
                                            RRCConnectionReestablishmentRequest-r8-IEs,
        criticalExtensionsFuture            SEQUENCE {}
    }
}

RRCConnectionReestablishmentRequest-r8-IEs ::= SEQUENCE {
    ue-Identity                             ReestabUE-Identity,
    reestablishmentCause                    ReestablishmentCause,
    spare                                   BIT STRING (SIZE (2))
}

ReestabUE-Identity ::=      SEQUENCE {
    c-RNTI,
    physCellId,
    shortMAC-I
}

ReestablishmentCause ::=    ENUMERATED {
    reconfigurationFailure, handoverFailure,
    otherFailure, spare1}

-- ASN1STOP
```

| RRCConnectionReestablishmentRequest field descriptions |
|---|
| *physCellId* |
| The Physical Cell Identity of the PCell the UE was connected to prior to the failure. |
| *reestablishmentCause* |
| Indicates the failure cause that triggered the re-establishment procedure. |
| *ue-Identity* |
| UE identity included to retrieve UE context and to facilitate contention resolution by lower layers. |

CONFIGURATION OF SMALL CELL BASE STATION 20B

CONFIGURATION OF SMALL CELL BASE STATION 20C

SCHEMATIC CONFIGURATION OF COMMUNICATION
APPARATUS ACCORDING TO PRESENT INVENTION

COMMUNICATION APPARATUS, WIRELESS COMMUNICATION SYSTEM AND COMMUNICATION METHOD

CROSS-REFERENCE TO RELATED APPLICATIONS

This application is a national stage application of International Application No. PCT/JP2015/075556 entitled "Communication Apparatus, Wireless Communication System and Communication Method" filed on Sep. 9, 2015, which claims priority to Japanese Application No. 2014-194688 filed on Sep. 25, 2014, the disclosures of which are hereby incorporated by reference in their entirety.

TECHNICAL FIELD

The present invention relates to a communication apparatus, a wireless communication system and a communication method.

BACKGROUND ART

In Long Term Evolution (LTE), a small cell having a small cell radius is defined as well as a macro cell having a large cell radius. In order to increase communication speed in a small area while taking advantage of a characteristic of covering a smaller area than a macro cell covering a broad area, a plurality of small cells are formed in a high-load region such as a downtown and a commercial building. In addition, in order to cover an indoor area within a macro cell where radio waves are hard to reach, a small cell is also formed indoors. Because of such a use application of a small cell, a macro cell and a plurality of small cells are often in an adjacent relationship with respect to each other. However, a plurality of small cells are not always in an adjacent relationship with respect to each other.

FIG. 1 illustrates an example of cell arrangement in an LTE wireless communication system.

In FIG. 1, Cell X that is a macro cell and Cells Y and Z that are small cells are in an adjacent relationship with respect to each other. However, Cell Y and Cell Z are not in an adjacent relationship with respect to each other.

Incidentally, in LTE, a Physical Cell Identity (PCI) is used as a cell identifier for identifying a cell. It is assumed herein that the term "cell identifier" refers to the PCI. The PCI is a cell identifier locally used for user equipment (UE) to identify a cell on a wireless section, and there are five hundred and four PCI values that are repeatedly used in LTE.

Thus, as illustrated in FIG. 1, there is a case in which Cells Y and Z adjacent to Cell X may have duplicate PCI values (=84). Such PCI value duplication is referred to as PCI confusion.

Herein, Cell X and Cells Y and Z are in an adjacent relationship with respect to each other. Thus, there is a case in which small cell base stations (hereinafter, referred to as Small cell base stations y and z) respectively forming Cells Y and Z can acquire neighbor information indicating neighboring cells adjacent to Cell X from a macro cell base station (hereinafter, referred to as Macro cell base station x) forming Cell X via a connection line or the like (e.g., X2 Interface). When Small cell base stations y and z can acquire neighbor information from Macro cell base station x, Small cell base stations y and z can determine that, on the basis of the neighbor information, PCI Confusion is occurring, in which Cells Y and Z have PCI values duplicate to each other. In this case, when any of Small cell base stations y and z autonomously re-selects a PCI value, the PCI confusion is eliminated.

However, there is a case in which Small cell base stations y and z cannot directly acquire neighbor information from Macro cell base station x via a connection line or the like. In addition, there is a case in which, even when Small cell base stations y and z can acquire neighbor information from Macro cell base station x, some of neighboring cells adjacent to Cell X cannot be recognized due to insufficiency of the neighbor information. In addition, since Cell Y and Cell Z are not in an adjacent relationship with respect to each other, Small cell base stations y and z cannot acquire neighbor information from the other side's small cell base station.

Accordingly, Small cell base stations y and z cannot determine that a PCI value of the own cell has caused PCI confusion in which the PCI value of the own cell is duplicated with a PCI value of the other cell in any of the cases described above. Small cell base stations y and z lose an opportunity to autonomously re-select a PCI value, and the PCI confusion is not eliminated.

Herein, think about a case in which a UE moves from Cell X to Cell Y while PCI confusion is occurring, in which PCI values of Cells Y and Z are duplicated to each other.

In this case, the UE transmits, to Macro cell base station x forming Cell X, a Measurement Report message including a PCI value "84" of Cell Y that is a handover destination candidate.

However, the PCI confusion state does not allow a value of an ECGI (E-UTRAN Cell Global Identifier. E-UTRAN: Evolved Universal Terrestrial Radio Access Network) corresponding to a PCI value to be uniquely determined. Herein, the ECGI refers to a cell identifier for uniquely identifying a cell throughout a communication network, unlike the PCI.

Thus, there is a case in which Macro cell base station x may request for handover not to Cell Y that is a handover destination candidate, but to wrong Cell Z having the same PCI value as that of Cell Y. In this case, there is a problem that handover fails and this results in a decrease in a handover success rate.

Examples of a technique for solving the problem include a method described in PTL 1. In the method described in PTL 1, while assuming a case in which there are a plurality of small cells using the same PCI value in a macro cell, UE adds, to a measurement report, a PCI value and a CGI value of a handover destination candidate cell.

CITATION LIST

Patent Literature

PTL 1: Japanese Unexamined Patent Application Publication No. 2010-109664

SUMMARY OF INVENTION

Technical Problem

According to the method described in PTL 1, since a CGI value of a handover destination candidate cell is uniquely determined, a probability that a macro cell base station requests for handover to a wrong cell can be lowered and a decrease in a handover success rate can be prevented.

However, in the method described in PTL 1, the UE needs to receive broadcast information on a handover destination candidate cell in order to know a CGI value of the cell. Thus, there is a problem that it takes a long time for acquiring the CGI value and this causes a delay in transmission of a measurement report.

Therefore, a decrease in a handover success rate needs to be prevented by using a method different from the method described in PTL 1.

For the purpose of the above, it is an issue to eliminate PCI confusion indicating duplication of a PCI value of a small cell with a PCI value of another cell regardless of an acquisition status of neighbor information in a small cell base station from a macro cell base station.

In view of the above, an object to be achieved by the exemplary embodiments disclosed herein is to provide a technique for solving the above-described issue and capable of eliminating cell identifier duplication between a cell identifier of a cell of a base station and a cell identifier of another cell regardless of an acquisition status of neighbor information in the base station. It should be noted that the object is merely one of a plurality of objects to be achieved by the exemplary embodiments disclosed herein. Other objects or issues and novel features will be apparent from the following description or the accompanying drawings.

Solution to Problem

A first communication apparatus according to the present invention is a communication apparatus in a wireless communication system including a terminal, a first base station forming a first cell, and a second base station forming a second cell adjacent to the first cell, including:

a communication status acquisition unit that acquires a communication status in the second base station; and a control unit that eliminates cell identifier duplication between a cell identifier of the second cell and a cell identifier of another cell based on the number of times that the second base station has received, from the terminal, a first message requesting for re-establishment of an RRC connection.

A second communication apparatus according to the present invention is a communication apparatus in a wireless communication system including a terminal, a first base station forming a first cell, and a second base station forming a second cell adjacent to the first cell, including:

a communication status acquisition unit that acquires a communication status in the second base station; and a control unit that eliminates cell identifier duplication between a cell identifier of the second cell and a cell identifier of another cell adjacent to the first cell based on the number of times that handover of the terminal from the first cell to the second cell has failed.

A first wireless communication system according to the present invention is a wireless communication system including a terminal, a first base station forming a first cell, and a second base station forming a second cell adjacent to the first cell, including:

a communication status acquisition unit that acquires a communication status in the second base station; and a control unit that eliminates cell identifier duplication between a cell identifier of the second cell and a cell identifier of another cell based on the number of times that the second base station has received, from the terminal, a first message requesting for re-establishment of an RRC connection.

A second wireless communication system according to the present invention is a wireless communication system including a terminal, a first base station forming a first cell, and a second base station forming a second cell adjacent to the first cell, including:

a communication status acquisition unit that acquires a communication status in the second base station; and a control unit that eliminates cell identifier duplication between a cell identifier of the second cell and a cell identifier of another cell adjacent to the first cell based on the number of times that handover of the terminal from the first cell to the second cell has failed.

A first communication method according to the present invention is a communication method performed by a communication apparatus in a wireless communication system including a terminal, a first base station forming a first cell, and a second base station forming a second cell adjacent to the first cell, including:

acquiring a communication status in the second base station; and eliminating cell identifier duplication between a cell identifier of the second cell and a cell identifier of another cell based on the number of times that the second base station has received, from the terminal, a first message requesting for re-establishment of an RRC connection.

A second communication method according to the present invention is a communication method performed by a communication apparatus in a wireless communication system including a terminal, a first base station forming a first cell, and a second base station forming a second cell adjacent to the first cell, including:

acquiring a communication status in the second base station; and eliminating cell identifier duplication between a cell identifier of the second cell and a cell identifier of another cell adjacent to the first cell based on the number of times that handover of the terminal from the first cell to the second cell has failed.

Advantageous Effects of Invention

The present invention can obtain an advantageous effect that a communication apparatus is capable of eliminating cell identifier duplication between a cell identifier of a cell of a base station and a cell identifier of another cell regardless of an acquisition status of neighbor information in the base station.

BRIEF DESCRIPTION OF DRAWINGS

FIG. 3 is a sequence diagram illustrating an example of a sequence in a case when handover succeeds in the wireless communication system illustrated in FIG. 2.

FIG. 4 is a sequence diagram illustrating an example of a sequence in a case when handover fails in the wireless communication system illustrated in FIG. 2.

FIG. 5 is a diagram illustrating an example of an RRC Connection Reestablishment Request message.

DESCRIPTION OF EMBODIMENTS (1) Basic Concept of the Present Invention

First, an overall configuration of a wireless communication system according to the present invention will be described.

Figure 1:
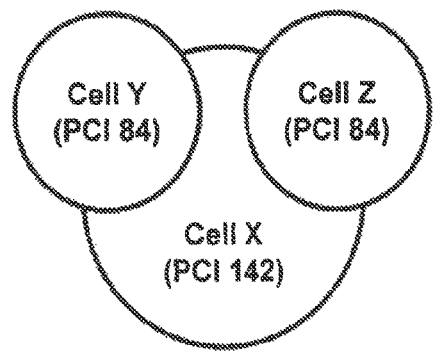
FIG. 1 is a diagram illustrating an example of cell arrangement in an LTE wireless communication system.
Figure 2:
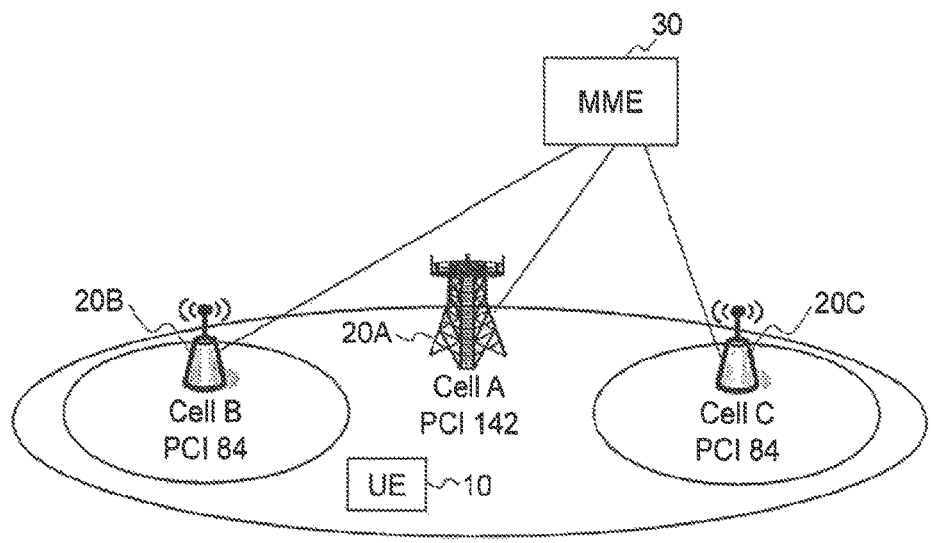
FIG. 2 is a diagram illustrating an example of an overall configuration of a wireless communication system according to the present invention.

FIG. 2 illustrates an example of an overall configuration of a wireless communication system according to the present invention.

The wireless communication system illustrated in FIG. 2 is an LTE wireless communication system that includes a UE 10, a macro cell base station 20A, small cell base stations 20B and 20C, and a Mobility Management Entity (MME) 30.

The macro cell base station 20A is a first base station forming Cell A (PCI value "142") that is a macro cell (first cell).

The small cell base station 20B is a second base station forming Cell B (PCI value "84") that is a small cell (second cell).

The small cell base station 20C is a second base station forming Cell C (PCI value "84") that is a small cell (second cell).

Cells B and C are provided within Cell A. Thus, Cell A and Cells B and C are in an adjacent relationship with respect to each other. However, Cell B and Cell C are not in an adjacent relationship with respect to each other.

Herein, it is assumed that a cell adjacent relationship includes a relationship between a certain cell and peripheral cells adjacent to the cell, without limitation to a relationship between a certain cell and cells included in the cell (a relationship between Cell A and Cells B and C) as illustrated in FIG. 2.

In addition, the PCI values of Cells B and C are both the same, "84". Thus, the PCI values of Cells B and C adjacent to Cell A are duplicate to each other, which means that PCI confusion is occurring.

The UE 10 is a terminal subjected to handover between Cells A to C. Note that handover when seen from a handover source and handover when seen from a handover destination are referred to as Handout and Hand-in, respectively, as appropriate.

The MME 30 is a core network device arranged in a core network and managing movement of the UE 10.

Note that the configuration and the cell arrangement of the wireless communication system in FIG. 2 are merely exemplary and the present invention is not limited thereto.

Next, as a technique that is a premise of the present invention, sequences in respective cases when handover of the UE 10 succeeds and fails in the wireless communication system illustrated in FIG. 2 will be described. A handover scenario via an inter-base station line (X2 Interface) will be introduced as an example. However, the same applies to a handover scenario using a line between a base station and a core network (S1 Interface).

First, a sequence in a case where handover of the UE 10 succeeds will be described.

FIG. 3 illustrates an example of a sequence in a case where handover of the UE 10 succeeds. Note that an operation in FIG. 3 starts from a state in which Cell A is a serving cell of the UE 10.

As illustrated in FIG. 3, the macro cell base station 20A forming Cell A that is a serving cell of the UE 10 transmits, to the UE 10, a Measurement Control message instructing measurement of reception quality of neighboring cells adjacent to Cell A (Step A1). The Measurement Control message herein indicates a message including information relating to measurement, and includes an RRC Connection Reconfiguration message as an example.

Next, the UE 10 measures reception quality of neighboring cells adjacent to Cell A and transmits, to the macro cell base station 20A, a Measurement Report message reporting a PCI value of a handover destination candidate cell with good reception quality out of these neighboring cells (Step A2). It is assumed herein that the UE 10 reports a PCI value "84" of Cell B. In addition, the macro cell base station 20A stores a PCI value and an ECGI value of a cell in association with each other, and it is assumed herein that the macro cell base station 20A stores an ECGI value of Cell B in association with the PCI value "84".

Thus, the macro cell base station 20A transmits, to the small cell base station 20B forming Cell B, a Handover Request message requesting for handover of the UE 10 to Cell B (Step A3).

In other words, a Handover Request message herein is transmitted to the small cell base station 20B forming correct Cell B that is a handover destination candidate.

Next, the small cell base station 20B transmits, to the macro cell base station 20A, a Handover Request Acknowledgement message accepting handover of the UE 10 (Step A4). The message includes information on an RRC connection between the UE 10 and Cell B that is a handover destination candidate cell.

Next, the macro cell base station 20A transmits, to the UE 10, an RRC Connection Reconfiguration message including information on the RRC connection between the UE 10 and Cell B that is a handover destination candidate cell (Step A5).

Herein, the Handover Request message at Step A3 has been transmitted to the small cell base station 20B forming correct Cell B that is a handover destination candidate cell of the UE 10.

Thus, the UE 10 completes reconfiguration of the RRC connection between the UE 10 and Cell B, and transmits, to the small cell base station 20B, an RRC Connection Reconfiguration Complete message notifying the completion of the RRC connection reconfiguration (Step A6). Accordingly, the serving cell of the UE 10 is switched from Cell A to Cell B.

Thereafter, the small cell base station 20B transmits, to the MME 30, a Path Switch Request message requesting for switching of a path from the macro cell base station 20A to the small cell base station 20B (Step A7). Then, the MME 30 transmits, to the small cell base station 20B, a Path Switch Request Acknowledgement message accepting switching of a path (Step A8). Subsequently, the small cell base station 20B transmits, to the macro cell base station 20A, a UE Context Release message instructing release of a UE Context (Step A9).

Next, a sequence in a case where handover of the UE 10 fails will be described.

FIG. 4 illustrates an example of a sequence in a case where handover of the UE 10 fails. Note that an operation in FIG. 4 starts from a state in which Cell A is a serving cell of the UE 10.

As illustrated in FIG. 4, first, transmission and reception of a Measurement Control message and a Measurement Report message are performed between the macro cell base station 20A and the UE 10 in the same manner as Steps A1 and A2 in FIG. 3 (Steps B1 and B2). However, it is assumed herein that the UE 10 reports a PCI value "84" of Cell C as a PCI value of a handover destination candidate cell. In addition, it is assumed that the macro cell base station 20A stores an ECGI value of Cell B in association with the PCI value "84".

Thus, the macro cell base station 20A transmits, to the small cell base station 20B forming Cell B, a Handover Request message requesting for handover of the UE 10 to Cell B (Step B3).

In other words, a Handover Request message herein is not transmitted to the small cell base station 20C forming correct Cell C that is a handover destination candidate, but is transmitted to the small cell base station 20B forming wrong Cell B that is not a handover destination candidate.

Next, the small cell base station 20B transmits, to the macro cell base station 20A, a Handover Request Acknowledgement message accepting handover of the UE 10 (Step B4).

Next, the macro cell base station 20A transmits, to the UE 10, an RRC Connection Reconfiguration message instructing reconfiguration of an RRC connection between the UE 10 and a handover destination candidate cell (Step B5).

Herein, the Handover Request message at Step B3 has been transmitted to the small cell base station 20B forming Cell B that is not a handover destination candidate of the UE 10.

Thus, the UE 10 does not complete reconfiguration of the RRC connection between the UE 10 and Cell C that is a handover destination candidate, and transmits, to the small cell base station 20C, an RRC Connection Reestablishment Request message requesting for re-establishment of the RRC connection (Step B6).

Next, the small cell base station 20C transmits, to the UE 10, an RRC Connection Reestablishment Reject message rejecting re-establishment of the RRC connection (Step B7).

Thereafter, an Attach procedure in which the UE 10 is attached to the small cell base station 20C is executed (Step B8). Accordingly, the serving cell of the UE 10 is switched from Cell A to Cell C.

Incidentally, in FIG. 4, the failure of handover of the UE 10 is able to be detected by the macro cell base station 20A. Besides, the small cell base station 20B and the small cell base station 20C are also able to detect the failure of handover of the UE 10 in a manner as follows.

For example, in FIG. 4, the small cell base station 20B receives a Handover Request message from the macro cell base station 20A and proceeds with the handover procedure, but does not receive an RRC Connection Reconfiguration Complete message from the UE 10. Thus, the small cell base station 20B is able to determine that handover (Hand-in) of the UE 10 from Cell A to Cell B has failed although the macro cell base station 20A has requested for the handover.

On the other hand, in FIG. 4, the small cell base station 20C does not receive a Handover Request message from the macro cell base station 20A, but receives an RRC Connection Reestablishment Request message from the UE 10. Thus, the small cell base station 20C is able to determine that handover of the UE 10 has failed. In addition, the small cell base station 20C is also able to determine the failure of handover of the UE 10 and a handover source cell of the UE 10 by referring to contents of the RRC Connection Reestablishment Request message as illustrated in FIG. 5. For example, the small cell base station 20C is able to determine the failure of handover of the UE 10 from the fact that "handoverFailure" and "reconfigurationFailure" are set in "Reestablishment Cause". In addition, the small cell base station 20C is able to determine a handover source cell of the UE 10 from a PCI value set in "physCellId" included in "ReestabUE-Identity".

The present invention is intended to eliminate PCI confusion indicating duplication of a PCI value of a cell of the small cell base stations 20B and 20C with a PCI value of another cell by using the fact that the small cell base stations 20B and 20C are able to detect the failure of handover of the UE 10.

(2) Exemplary Embodiments of the Present Invention
(2-1) First Exemplary Embodiment The present exemplary embodiment is intended for the small cell base station 20B to determine occurrence of PCI confusion in the wireless communication system illustrated in FIG. 2.

In view of the above, the following will describe a configuration of the small cell base station 20B in detail.

Figure 6:
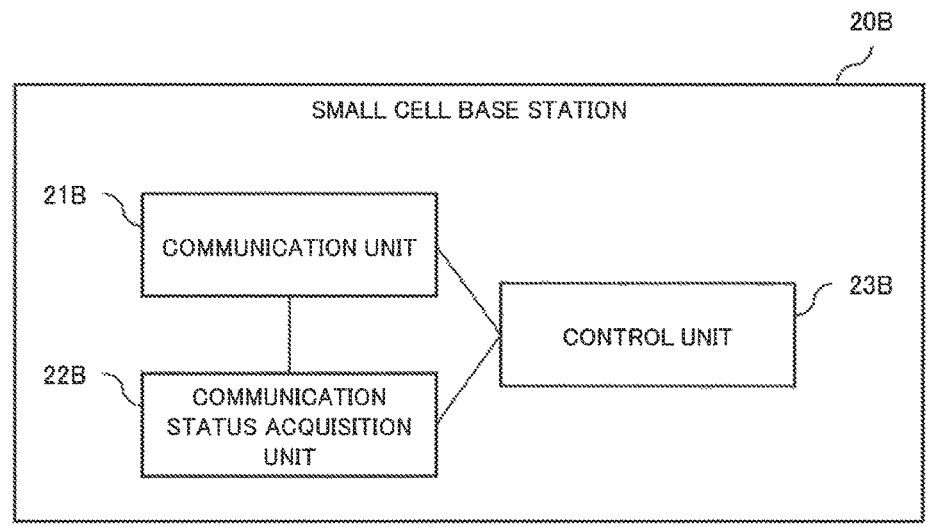
FIG. 6 is a block diagram illustrating an example of a configuration of a small cell base station according to a first exemplary embodiment of the present invention.

FIG. 6 illustrates an example of a configuration of the small cell base station 20B according to the present exemplary embodiment.

As illustrated in FIG. 6, the small cell base station 20B includes a communication unit 21B, a communication status acquisition unit 22B, and a control unit 23B. Note that FIG. 6 illustrates only an excerpt of essential components from the components within the small cell base station 20B and omits other components.

The communication unit 21B communicates various messages and the like with the UE 10, the macro cell base station 20A, the small cell base station 20C, and the MME 30.

The communication status acquisition unit 22B acquires a communication status of various messages and the like in the small cell base station 20B.

The control unit 23B eliminates PCI value duplication (PCI confusion) between a PCI value of Cell B and a PCI value of another cell adjacent to Cell A on the basis of the number of times that handover of the UE 10 from Cell A to Cell B has failed.

Specifically, the control unit 23B counts the number of times that handover of the UE 10 from Cell A to Cell B has failed. For example, when the control unit 23B receives no RRC Connection Reconfiguration Complete message from the UE 10 within a predetermined period of time after receiving a Handover Request message requesting for handover (Hand-in) of the UE 10 from Cell A to Cell B, the control unit 23B is able to determine that the handover has failed.

Then, when the number of times that handover (Hand-in) of the UE 10 from Cell A to Cell B has failed is equal to or more than a predetermined number of times, the control unit 23B determines that a PCI value of Cell B is duplicated with a PCI value of another cell adjacent to Cell A and has caused PCI confusion.

Note that the control unit 23B is able to determine that Cell A is a handover source of the UE 10 from the Handover Request message.

In addition, the control unit 23B may determine PCI confusion only in a case (A) or (B) below.

(A) When the small cell base station 20B is unable to directly acquire neighbor information indicating neighboring cells adjacent to Cell A from the macro cell base station 20A via a connection line such as an X2 Interface or the like (B) When the small cell base station 20B is unable to recognize some of neighboring cells adjacent to Cell A due to insufficiency in neighbor information indicating neighboring cells adjacent to Cell A acquired from the macro cell base station 20A Note that the case (B) where neighbor information is insufficient refers to, for example, a case where neighbor information acquired from the macro cell base station 20A indicates only a neighboring cell establishing an X2 interface out of neighboring cells adjacent to Cell A. In addition, whether the case (B) is applicable or not can be determined by, for example, whether the number of neighboring cells indicated by neighbor information acquired from the macro cell base station 20A is equal to or less than a predetermined number or not.

In addition, the control unit 23B may determine PCI confusion with arbitrary timing, for example, periodically. Alternatively, the control unit 23B may determine PCI confusion at a point in time when the number of times that handover has failed is, as a result of counting the number, equal to or more than a predetermined number of times.

When determining that a PCI value of Cell B is duplicated with a PCI value of another cell adjacent to Cell A and has caused PCI confusion, the control unit 23B eliminates the PCI confusion. When eliminating the PCI confusion, the control unit 23B autonomously re-selects a PCI value of Cell B.

At this time, for example, the control unit 23B excludes the current PCI value and a PCI value having been selected several times in the past from re-selection candidates, and re-selects a PCI value from the remaining re-selection candidates.

Note that changing a PCI value of Cell B so as to be different from a PCI value of a neighboring cell adjacent to Cell B and a PCI value of a neighboring cell adjacent to the aforesaid neighboring cell falls under a general technique and is not directly relevant to the present invention. In addition, it is necessary to avoid only PCI value duplication in an identical frequency of an identical Radio Access Technology (RAT), and changing in such a manner also falls under a general technique.

Alternatively, the control unit 23B may request for allocation of a new PCI value from an external server rather than autonomously re-selecting a PCI value of Cell B, and the external server accepting the request may allocate a new PCI value to Cell B. In this case, the external server desirably holds information on neighboring cells adjacent to Cell B as a database.

As described above, according to the present exemplary embodiment, the control unit 23B of the small cell base station 20B eliminates PCI value duplication (PCI confusion) between a PCI value of Cell B and a PCI value of another cell adjacent to Cell A on the basis of the number of times that handover of the UE 10 from Cell A to Cell B has failed.

Thus, an advantageous effect of being capable of eliminating PCI confusion can be obtained regardless of an acquisition status of neighbor information in the small cell base station 20B. Accordingly, the macro cell base station 20A is able to request for handover of the UE 10 to a correct cell, and a decrease in a handover success rate of the UE 10 can be prevented.

Specifically, when the number of times that handover of the UE 10 from Cell A to Cell B has failed is equal to or more than a predetermined number of times, the control unit 23B of the small cell base station 20B determines that a PCI value of Cell B is duplicated with a PCI value of another cell adjacent to Cell A and has caused PCI confusion.

In addition, when determining that PCI confusion is occurring, the control unit 23B eliminates the PCI confusion by autonomously re-selecting a PCI value or requesting for allocation of a new PCI value from an external server. Note that the control unit 23B may cause the another cell adjacent to Cell A to re-select a PCI value.

(2-2) Second Exemplary Embodiment

In the first exemplary embodiment, the macro cell base station 20A transmits a Handover Request message to a single base station forming a handover destination candidate cell. However, it is also contemplated that a plurality of cells (that may have different PCIs) are handover destination candidate cells and the macro cell base station 20A is configured to have a mechanism of transmitting a Handover Request message to a plurality of base stations respectively forming these plurality of cells. In this case, in the first exemplary embodiment, a number of base stations having received a Handover Request message result in receiving no RRC Connection Reconfiguration Complete message. It is then predicted that these base stations may erroneously determine that PCI confusion is occurring even though in fact PCI confusion is not occurring.

In order to solve the above-described problem in the first exemplary embodiment, the present exemplary embodiment is intended for the small cell base station 20C to determine occurrence of PCI confusion in the wireless communication system illustrated in FIG. 2.

In view of the above, the following will describe a configuration of the small cell base station 20C in detail.

Figure 7:
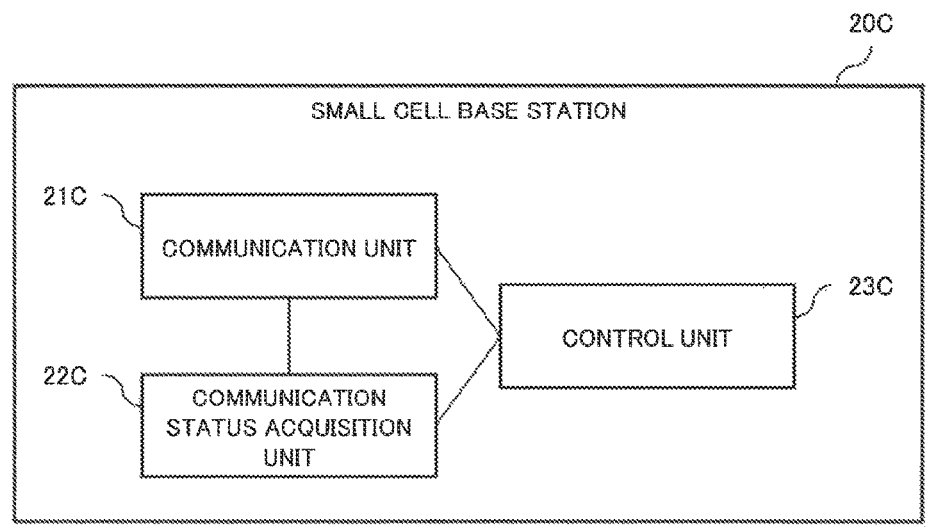
FIG. 7 is a block diagram illustrating an example of a configuration of a small cell base station according to second and third exemplary embodiments of the present invention.

FIG. 7 illustrates an example of a configuration of the small cell base station 20C according to the present exemplary embodiment.

As illustrated in FIG. 7, the small cell base station 20C includes a communication unit 21C, a communication status acquisition unit 22C, and a control unit 23C. Note that FIG. 7 illustrates only an excerpt of essential components from the components within the small cell base station 20C and omits other components.

The communication unit 21C communicates various messages and the like with the UE 10, the macro cell base station 20A, the small cell base station 20B, and the MME 30.

The communication status acquisition unit 22C acquires a communication status of various messages and the like in the small cell base station 20C.

The control unit 23C eliminates PCI value duplication (PCI confusion) between a PCI value of Cell C and a PCI value of another cell on the basis of the number of times that an RRC Connection Reestablishment Request message has been received from the UE 10.

Specifically, the control unit 23C counts the number of times that an RRC Connection Reestablishment Request message has been received from the UE 10.

Then, when the number of times that an RRC Connection Reestablishment Request message has been received from the UE 10 is equal to or more than a predetermined number of times, the control unit 23C determines that a PCI value of Cell C is duplicated with a PCI value of another cell and has caused PCI confusion.

Note that the control unit 23C may count the number of times of reception only when a particular RRC Connection Reestablishment Request message is received rather than all RRC Connection Reestablishment Request messages.

For example, the control unit 23C may count the number of times of reception only for an RRC Connection Reestablishment Request message in which a PCI value set in "physCellId" included in "ReestabUE-Identity" indicates Cell A. "physCellId" indicates a PCI value of a cell to which the UE 10 has been connected before handover failure. For example, in FIG. 4, since Cell A is a cell to which the UE 10 has been connected before handover failure, a PCI value of Cell A is written in "physCellId". In this case, when the number of times of reception thereof is equal to or more than a predetermined number of times, the control unit 23C determines that a PCI value of Cell C is duplicated with a PCI value of another cell adjacent to Cell A and has caused PCI confusion. In this case, the control unit 23C may determine PCI confusion only in a case (A) or (B) below.
(A) When the small cell base station 20C is unable to directly acquire neighbor information indicating neighboring cells adjacent to Cell A from the macro cell base station 20A via a connection line such as an X2 Interface or the like
(B) When the small cell base station 20C is unable to recognize some of neighboring cells adjacent to Cell A due to insufficiency in neighbor information indicating neighboring cells adjacent to Cell A acquired from the macro cell base station 20A Note that the definition of "insufficiency" in (B) and the determination method as to whether (B) is applicable or not are the same as those in the first exemplary embodiment.

Alternatively, the control unit 23C may count the number of times of reception only for an RRC Connection Reestablishment Request message in which "ReestablishmentCause" is set to "handoverFailure" or "reconfigurationFailure". "ReestablishmentCause" indicates a cause of re-establishment of an RRC connection, and "handoverFailure" (handover failure), "reconfigurationFailure" (failure of RRC connection reconfiguration), and the like are written in "ReestablishmentCause", as illustrated in FIG. 5. For example, in FIG. 4, since the UE 10 has failed in handover and reconfiguration of the RRC connection between the UE 10 and Cell C has not been completed, "handoverFailure" or "reconfigurationFailure" is written in "ReestablishmentCause". In this case, when the number of times of reception thereof is equal to or more than a predetermined number of times, the control unit 23C determines that a PCI value of Cell C is duplicated with a PCI value of another cell and has caused PCI confusion.

Alternatively, the control unit 23C may count the number of times of reception only for an RRC Connection Reestablishment Request message in which a PCI value set in "physCellId" included in "ReestabUE-Identity" indicates Cell A and "ReestablishmentCause" is set to "handoverFailure" or "reconfigurationFailure". In this case, when the number of times of reception thereof is equal to or more than a predetermined number of times, the control unit 23C determines that a PCI value of Cell C is duplicated with a PCI value of another cell adjacent to Cell A and has caused PCI confusion.

Note that the control unit 23C may determine PCI confusion with arbitrary timing, for example, periodically.

In addition, processing performed by the control unit 23C when the control unit 23C determines that a PCI value of Cell C has caused PCI confusion and eliminates the PCI confusion is the same as that in the first exemplary embodiment.

As described above, according to the present exemplary embodiment, the control unit 23C of the small cell base station 20C eliminates PCI value duplication (PCI confusion) between a PCI value of Cell C and a PCI value of another cell on the basis of the number of times that an RRC Connection Reestablishment Request message has been received from the UE 10.

Thus, an advantageous effect of being capable of eliminating PCI confusion can be obtained regardless of an acquisition status of neighbor information in the small cell base station 20C. Accordingly, the macro cell base station 20A is able to request for handover of the UE 10 to a correct cell, and a decrease in a handover success rate of the UE 10 can be prevented.

Specifically, when the number of times that an RRC Connection Reestablishment Request message has been received from the UE 10 is equal to or more than a predetermined number of times, the control unit 23C of the small cell base station 20C determines that a PCI value of Cell C is duplicated with a PCI value of another cell and has caused PCI confusion.

In addition, when determining that PCI confusion is occurring, the control unit 23C eliminates the PCI confusion by autonomously re-selecting a PCI value or requesting for allocation of a new PCI value from an external server. Note that the control unit 23C may cause the another cell to re-select a PCI value.

(2-3) Third Exemplary Embodiment

In the second exemplary embodiment, the small cell base station 20C determines PCI confusion by using the number of times that an RRC Connection Reestablishment Request message has been received from the UE 10.

However, when an RRC Connection Reestablishment Request message is received from the UE 10, there is also a possibility that the cause thereof may be Too Late HO or Too Early HO.

Thus, it is necessary to exclude an RRC Connection Reestablishment Request message attributed to Too Late HO or Too Early HO from a subject for which the number of times of reception of an RRC Connection Reestablishment Request message is counted.

The present exemplary embodiment solves the above-described problem in the second exemplary embodiment and is intended for the small cell base station 20C to exclude an RRC Connection Reestablishment Request message attributed to Too Late HO or Too Early HO from a subject for which the number of times of reception of an RRC Connection Reestablishment Request message is counted in the wireless communication system illustrated in FIG. 2.

Note that a configuration itself of the present exemplary embodiment is the same as that in the second exemplary embodiment.

(2-3-1) About Too Early HO

First, Too Early HO will be described.

Figure 8:
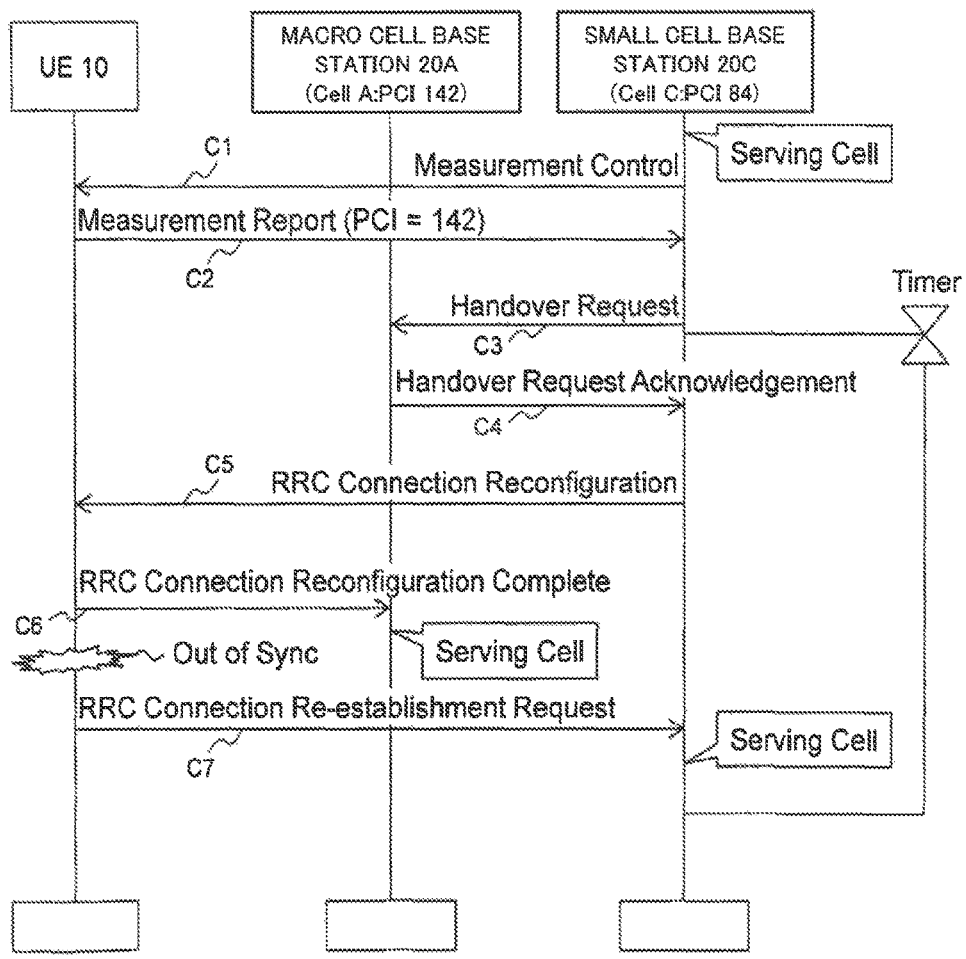
FIG. 8 is a sequence diagram illustrating an example of a sequence in a case when handover is attributed to Too Early HO in a wireless communication system according to the third exemplary embodiment of the present invention.

FIG. 8 illustrates an example of a sequence in a case where handover of the UE 10 from Cell C to Cell A is attributed to Too Early HO and a method for excluding an RRC Connection Reestablishment Request message attributed to the Too Early HO. Note that an operation in FIG. 8 starts from a state in which Cell C is a serving cell of the UE 10.

As illustrated in FIG. 8, the small cell base station 20C forming Cell C that is a serving cell of the UE 10 transmits, to the UE 10, a Measurement Control message instructing measurement of reception quality of neighboring cells adjacent to Cell C (Step C1).

Next, the UE 10 measures reception quality of neighboring cells adjacent to Cell C, and transmits, to the small cell base station 20C, a Measurement Report message reporting a PCI value of a handover destination candidate cell with good reception quality out of these neighboring cells (Step C2). It is assumed herein that the UE 10 reports a PCI value "142" of Cell A. In addition, the small cell base station 20C stores a PCI value and an ECGI value of a cell in association with each other, and it is assumed herein that the small cell base station 20C stores an ECGI value of Cell A in association with the PCI value "142".

Thus, the small cell base station 20C transmits, to the macro cell base station 20A forming Cell A, a Handover Request message requesting for handover of the UE 10 to Cell A (Step C3).

In other words, a Handover Request message herein is transmitted to the macro cell base station 20A forming correct Cell A that is a handover destination candidate.

Next, the macro cell base station 20A transmits, to the small cell base station 20C, a Handover Request Acknowledgement message accepting handover of the UE 10 (Step C4).

Next, the small cell base station 20C transmits, to the UE 10, an RRC Connection Reconfiguration message instructing reconfiguration of an RRC connection between the UE 10 and a handover destination candidate cell (Step C5).

Herein, the Handover Request message at Step C3 has been transmitted to the macro cell base station 20A forming correct Cell A that is a handover destination candidate of the UE 10.

Thus, the UE 10 completes reconfiguration of the RRC connection between the UE 10 and Cell A, and transmits, to the macro cell base station 20A, an RRC Connection Reconfiguration Complete message notifying the completion of the RRC connection reconfiguration (Step C6). Accordingly, the serving cell of the UE 10 is switched from Cell C to Cell A.

Thereafter, processing substantially the same as Steps A7 to A9 in FIG. 3 is normally performed. Herein, however, due to the too early handover of the UE 10 to Cell A, Out of Sync is caused between the UE 10 and Cell A. Thus, the UE 10 transmits an RRC Connection Reestablishment Request message to the small cell base station 20C forming Cell C that is a previous serving cell (Step C7). Accordingly, the serving cell of the UE 10 is switched from Cell A to Cell C again.

The above is an overview of Too Early HO.

As described above, an RRC Connection Reestablishment Request message at Step C7 is attributed to Too Early HO. However, if the number of times of reception is counted for the RRC Connection Reestablishment Request message as being attributed to PCI confusion, there arises a possibility that Too Early HO may be erroneously determined as being PCI confusion.

In view of the above, the control unit 23C determines, at a time of receiving an RRC Connection Reestablishment Request message from the UE 10, whether a Handover Request message requesting for handover of the UE 10 from Cell C to Cell A has been transmitted within a predetermined period of time before the reception of the RRC Connection Reestablishment Request message.

Specifically, the control unit 23C starts a timer after the transmission of the Handover Request message at Step C3, and when a value of the timer at a time of receiving the RRC Connection Reestablishment Request message at Step C7 is equal to or smaller than a predetermined period of time, determines that the Handover Request message has been transmitted within the predetermined period of time.

When the Handover Request message has been transmitted as described above, the control unit 23C excludes the RRC Connection Reestablishment Request message at Step C7 as being attributed to Too Early HO and does not count the number of times of reception for the RRC Connection Reestablishment Request message.

On the other hand, when no Handover Request message has been transmitted as described above, the control unit 23C determines the RRC Connection Reestablishment Request message at Step C7 as being attributed to PCI confusion and counts the number of times of reception for the RRC Connection Reestablishment Request message.

(2-3-2) About Too Late HO

Next, Too Late HO will be described.

Figure 9:
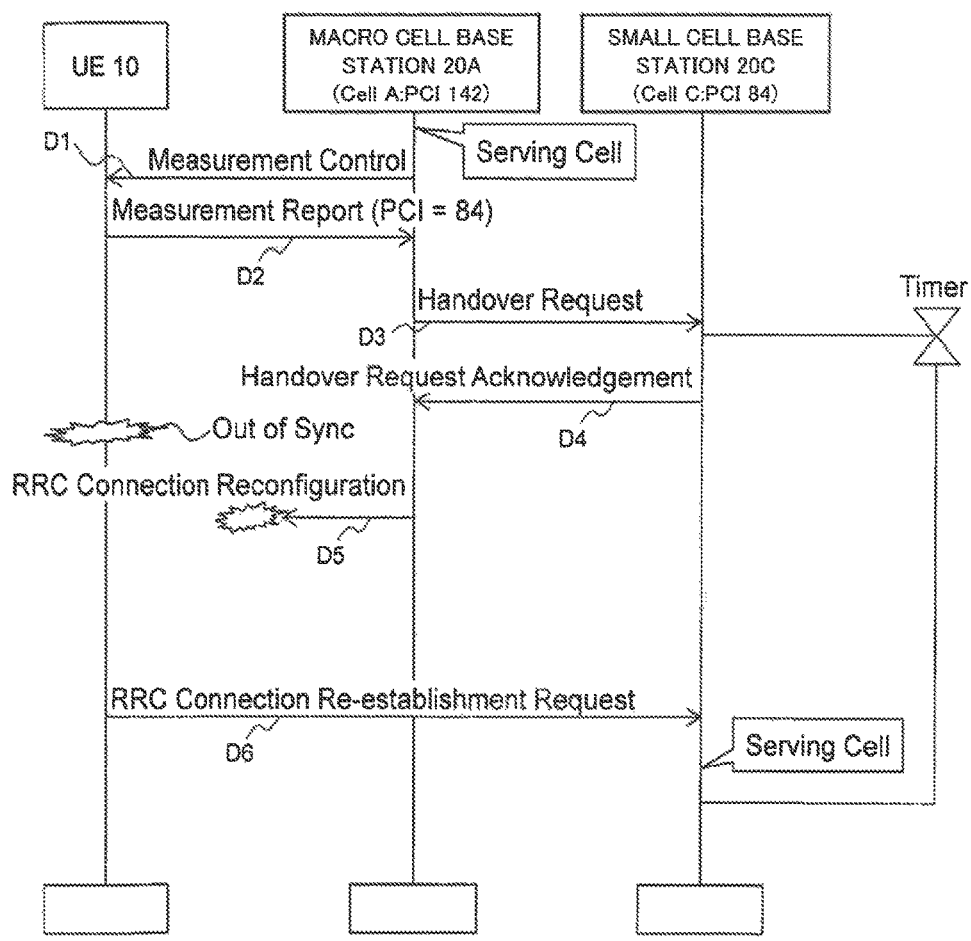
FIG. 9 is a sequence diagram illustrating an example of a sequence in a case when handover is attributed to Too Late HO in a wireless communication system according to the third exemplary embodiment of the present invention.

FIG. 9 illustrates an example of a sequence in a case when handover of the UE 10 from Cell A to Cell C is attributed to Too Late HO and a method for excluding an RRC Connection Reestablishment Request message attributed to the Too Late HO. Note that an operation in FIG. 9 starts from a state in which Cell A is a serving cell of the UE 10.

As illustrated in FIG. 9, the macro cell base station 20A forming Cell A that is a serving cell of the UE 10 transmits, to the UE 10, a Measurement Control message instructing measurement of reception quality of neighboring cells adjacent to Cell A (Step D1).

Next, the UE 10 measures reception quality of neighboring cells adjacent to Cell A, and transmits, to the macro cell base station 20A, a Measurement Report message reporting a PCI value of a handover destination candidate cell with good reception quality out of these neighboring cells (Step D2). It is assumed herein that the UE 10 reports a PCI value "84" of Cell C. In addition, the macro cell base station 20A stores a PCI value and an ECGI value of a cell in association with each other, and it is assumed herein that the macro cell base station 20A stores an ECGI value of Cell C in association with the PCI value "84".

Thus, the macro cell base station 20A transmits, to the small cell base station 20C forming Cell C, a Handover Request message requesting for handover of the UE 10 to Cell C (Step D3).

In other words, a Handover Request message herein is transmitted to the small cell base station 20C forming correct Cell C that is a handover destination candidate.

Next, the small cell base station 20C transmits, to the macro cell base station 20A, a Handover Request Acknowledgement message accepting handover of the UE 10 (Step D4).

Herein, however, due to the too late handover of the UE 10 to Cell C, Out of Sync is caused between the UE 10 and Cell A.

As a result, the macro cell base station 20A is unable to transmit, to the UE 10, an RRC Connection Reconfiguration message instructing reconfiguration of an RRC connection between the UE 10 and a handover destination candidate cell (Step D5).

Thus, the UE 10 transmits an RRC Connection Reestablishment Request message to the small cell base station 20C forming Cell C that is a handover destination candidate (Step D6). Accordingly, the serving cell of the UE 10 is switched from Cell A to Cell C.

The above is an overview of Too Late HO.

As described above, an RRC Connection Reestablishment Request message at Step D6 is attributed to Too Late HO. However, if the number of times of reception is counted for the RRC Connection Reestablishment Request message as being attributed to PCI confusion, there arises a possibility that Too Late HO may be erroneously determined as being PCI confusion.

In view of the above, the control unit 23C determines, at a time of receiving an RRC Connection Reestablishment Request message from the UE 10, whether a Handover Request message requesting for handover of the UE 10 from Cell A to Cell C has been received within a predetermined period of time before the reception of the RRC Connection Reestablishment Request message.

Specifically, the control unit 23C starts a timer after the reception of the Handover Request message at Step D3, and when a value of the timer at a time of receiving the RRC Connection Reestablishment Request message at Step D6 is equal to or smaller than a predetermined period of time, determines that the Handover Request message has been received within the predetermined period of time.

When the Handover Request message has been received as described above, the control unit 23C excludes the RRC Connection Reestablishment Request message at Step D6 as being attributed to Too Late HO and does not count the number of times of reception for the RRC Connection Reestablishment Request message.

On the other hand, when no Handover Request message has been received as described above, the control unit 23C determines the RRC Connection Reestablishment Request message at Step D6 as being attributed to PCI confusion and counts the number of times of reception for the RRC Connection Reestablishment Request message.

Note that the method for excluding an RRC Connection Reestablishment Request message attributed to Too Early HO and the method for excluding an RRC Connection Reestablishment Request message attributed to Too Late HO may be simultaneously applied.

As described above, according to the present exemplary embodiment, the control unit 23C of the small cell base station 20C, at a time of receiving an RRC Connection Reestablishment Request message, does not count the number of times of reception for the RRC Connection Reestablishment Request message when a Handover Request message requesting for handover from Cell C to Cell A has been transmitted within a predetermined period of time immediately before the reception of the RRC Connection Reestablishment Request message.

In addition, the control unit 23C, at a time of receiving an RRC Connection Reestablishment Request message, does not count the number of times of reception for the RRC Connection Reestablishment Request message when a Handover Request message requesting for handover from Cell A to Cell C has been received within a predetermined period of time immediately before the reception of the RRC Connection Reestablishment Request message.

Accordingly, since an RRC Connection Reestablishment Request message attributed to Too Late HO or Too Early HO is able to be excluded from a subject for which the number of times of reception of an RRC Connection Reestablishment Request message is counted, erroneous determination of Too Early HO or Too Late HO as being PCI confusion can be prevented.

Note that configurations and advantageous effects of the present exemplary embodiment other than the above are the same as those in the second exemplary embodiment.

In the above, the present invention has been described with reference to the exemplary embodiments. However, the present invention is not limited to the above exemplary embodiments. Various modifications that can be understood by those skilled in the art can be made to the configurations and details of the present invention within the scope of the present invention.

For example, in the first to third exemplary embodiments, a small cell base station determines occurrence of PCI confusion, but the present invention is not limited thereto. In the present invention, another type of a base station such as a macro cell base station may determine occurrence of PCI confusion between the own cell and a neighboring cell adjacent thereto or a neighboring cell adjacent to the aforesaid neighboring cell.

In addition, in the first to third exemplary embodiments, a base station determines occurrence of PCI confusion, but the present invention is not limited thereto. In the present invention, an external communication apparatus such as a Self Organizing Network (SON) server may determine occurrence of PCI confusion. In this case, the external communication apparatus acquires, from a base station, information on a communication status in the base station and determines whether a PCI value of the base station has caused PCI confusion on the basis of the information. In addition, the external communication apparatus notifies the base station of the occurrence of PCI confusion.

In addition, in the first to third exemplary embodiments, a PCI is used as an example, but without limitation thereto, the present invention is applicable to another locally used cell identifier. Examples of the another locally used cell identifier include a primary scrambling code in Third Generation Wideband Code Division Multiple Access (3G WCDMA).

In addition, in the first to third exemplary embodiments, it is premised that Cells A to C are E-UTRAN cells of LTE, but the present invention is not limited thereto. In the present invention, Cells A to C may be any cells such as 3G WCDMA cells, CDMA2000 cells, or Second Generation Global System for Mobile communications (2G GSM) cells.

In addition, in the first to third exemplary embodiments, handover of the UE 10 may be X2 Handover, S1 handover, or Inter RAT Handover.

(3) Summary of the Present Invention

Finally, the summary of the present invention will be described.

Figure 10:
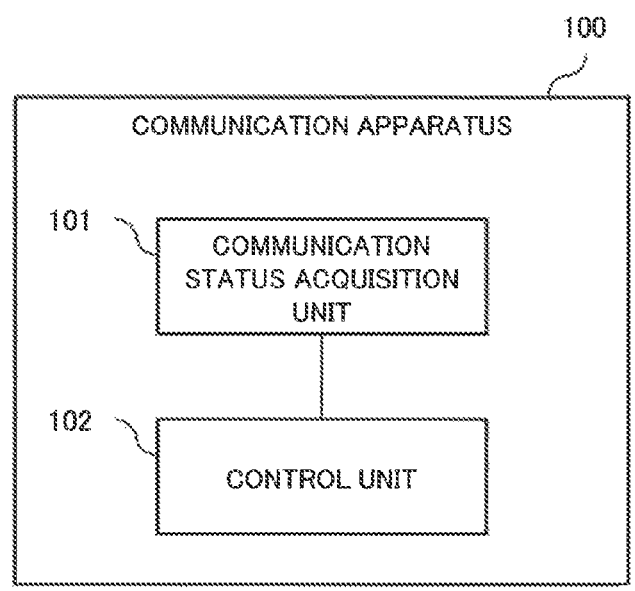
FIG. 10 is a block diagram illustrating an example of a schematic configuration of a communication apparatus according to the present invention.

FIG. 10 illustrates a schematic configuration of a communication apparatus according to the present invention.

As illustrated in FIG. 10, a communication apparatus 100 according to the present invention includes a communication status acquisition unit 101 and a control unit 102.

The communication apparatus 100 is intended to be applied, in a wireless communication system including a terminal, a first base station forming a first cell, and a second base station forming a second cell adjacent to the first cell, as the second base station or a SON server.

The communication status acquisition unit 101 is intended to be equivalent to the communication status acquisition unit 22B in the first exemplary embodiment (FIG. 6) and the communication status acquisition unit 22C in the second and third exemplary embodiments (FIG. 7), and acquires a communication status such as various messages in the second base station.

Note that when the communication apparatus 100 is a SON server, the communication status acquisition unit 101 acquires a communication status in the second base station from the second base station.

The control unit 102 is intended to be equivalent to the control unit 23B in the first exemplary embodiment (FIG. 6) and the control unit 23C in the second and third exemplary embodiments (FIG. 7).

For example, the control unit 102 eliminates cell identifier duplication (PCI confusion) between a cell identifier of the second cell and a cell identifier of another cell adjacent to the first cell on the basis of the number of times that handover of the terminal from the first cell to the second cell has failed (equivalent to the first exemplary embodiment).

Alternatively, the control unit 102 eliminates cell identifier duplication (PCI confusion) between a cell identifier of the second cell and a cell identifier of another cell on the basis of the number of times that the second base station has received, from the terminal, a message requesting for re-establishment of an RRC connection (equivalent to the second exemplary embodiment).

Thus, the present invention can obtain an advantageous effect of being capable of eliminating PCI confusion regardless of an acquisition status of neighbor information in the second base station from the first base station.

In the above, the present invention has been described with reference to the exemplary embodiments. However, the present invention is not limited to the above exemplary embodiments. Various modifications that can be understood by those skilled in the art can be made to the configurations and details of the present invention within the scope of the present invention.

The invention claimed is:

1. A communication apparatus in a wireless communication system including a terminal, a first base station forming a first cell, and a second base station forming a second cell adjacent to the first cell, comprising:
    a communication status acquisition unit configured to acquire a communication status in the second base station; and
    a control unit configured to eliminate cell identifier duplication between a cell identifier of the second cell and a cell identifier of another cell when a number of times that the second base station received, from the terminal, a first message requesting for re-establishment of an RRC connection is equal to or more than a predetermined value,
    wherein the first message indicates that handover failure or reconfiguration failure of the RRC connection is a cause of re-establishment of the RRC connection.

2. The communication apparatus according to claim 1, wherein the first message indicates that the first cell is a cell to which the terminal was connected before handover failure.

3. The communication apparatus according to claim 1, wherein the control unit, at a time of reception of the first message from the terminal, does not count the number of times of reception for the first message when the second base station transmitted, to the first base station, a second message requesting for handover of the terminal from the second cell to the first cell within a predetermined period of time before the reception of the first message.

4. The communication apparatus according to claim 1, wherein the control unit, at a time of reception of the first message from the terminal, does not count the number of times of reception for the first message when the second base station received, from the first base station, a third message requesting for handover of the terminal from the first cell to the second cell within a predetermined period of time before the reception of the first message.

5. A communication apparatus in a wireless communication system including a terminal, a first base station forming a first cell, and a second base station forming a second cell adjacent to the first cell, comprising:
    a communication status acquisition unit configured to acquire a communication status in the second base station; and
    a control unit configured to eliminate cell identifier duplication between a cell identifier of the second cell and a cell identifier of another cell adjacent to the first cell based on a number of times that handover of the terminal from the first cell to the second cell failed;
    wherein the control unit determines that handover of the terminal from the first cell to the second cell failed when the second base station does not receive, from the terminal, a second message notifying completion of reconfiguration of an RRC connection within a predetermined period of time after receiving, from the first base station, a first message requesting for handover of the terminal from the first cell to the second cell.

6. The communication apparatus according to claim 5, wherein
    the control unit re-selects a cell identifier of the second cell when eliminating cell identifier duplication between a cell identifier of the second cell and a cell identifier of another cell.

7. The communication apparatus according to claim 5, wherein
    the control unit requests for allocation of a new cell identifier of the second cell from an external server when eliminating cell identifier duplication between a cell identifier of the second cell and a cell identifier of another cell.

8. A communication method performed by a communication apparatus in a wireless communication system including a terminal, a first base station forming a first cell, and a second base station forming a second cell adjacent to the first cell, comprising:
    acquiring a communication status in the second base station; and
    eliminating cell identifier duplication between a cell identifier of the second cell and a cell identifier of another cell when a number of times that the second base station received, from the terminal, a first message requesting for re-establishment of an RRC connection is equal to or more than a predetermined value,
    wherein the first message indicates that handover failure or reconfiguration failure of the RRC connection is a cause of re-establishment of the RRC connection.

* * * * *